(12) United States Patent
Enomoto et al.

(10) Patent No.: US 7,626,301 B2
(45) Date of Patent: Dec. 1, 2009

(54) ELECTRIC ROTATING MACHINE HAVING PERMANENT MAGNETS AND METHOD OF MANUFACTURING TEETH PORTIONS OF THE STATOR IRON CORE

(75) Inventors: Yuji Enomoto, Hitachi (JP); Haruo Koharagi, Hitachi (JP); Motoya Ito, Hitachinaka (JP); Katsuyuki Yamasaki, Chiba (JP); Ryoso Masaki, Hitachi (JP); Shoji Ohiwa, Iwatsuiki (JP); Chio Ishihara, Tokyo (JP); Masahiro Mita, Fukaya (JP)

(73) Assignees: Japan Servo Co., Ltd., Tokyo (JP); Hitachi Powdered Metals Co., Ltd., Matsudo-shi (JP); Hitachi Industrial Equipment Systems Co., Ltd., Tokyo (JP); Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/231,943

(22) Filed: Sep. 22, 2005

(65) Prior Publication Data

US 2006/0082241 A1    Apr. 20, 2006

(30) Foreign Application Priority Data

Sep. 30, 2004    (JP) .............................. 2004-287661

(51) Int. Cl.
*H02K 1/00*    (2006.01)
(52) U.S. Cl. ........................ 310/216; 310/254; 310/259
(58) Field of Classification Search ......... 310/216–218, 310/254, 258, 259
See application file for complete search history.

(56) References Cited

U.S. PATENT DOCUMENTS

| 4,255,684 | A | * | 3/1981 | Mischler et al. ............. 310/216 |
| 4,291,235 | A | * | 9/1981 | Bergey et al. ................. 290/55 |
| 4,363,988 | A | * | 12/1982 | Kliman ....................... 310/268 |
| 4,392,072 | A | * | 7/1983 | Rosenberry ................. 310/216 |
| 4,403,401 | A | * | 9/1983 | Rosenberry ................. 29/596 |
| 4,797,602 | A | * | 1/1989 | West ........................... 322/10 |
| 4,827,235 | A | * | 5/1989 | Inomata et al. ............. 335/297 |
| 6,140,728 | A | * | 10/2000 | Tomita et al. .......... 310/156.12 |
| 6,163,952 | A | * | 12/2000 | Takehara ..................... 29/598 |
| 6,420,813 | B1 | * | 7/2002 | DeCristofaro et al. ....... 310/216 |
| 6,462,456 | B1 | * | 10/2002 | DeCristofaro et al. ....... 310/216 |
| 2002/0158540 | A1 | | 10/2002 | Lindquist |

FOREIGN PATENT DOCUMENTS

| CN | 2357434 Y | 1/2000 |
| CN | 2464008 Y | 12/2001 |
| JP | 2002-518975 | 12/1999 |

OTHER PUBLICATIONS

English translation of corresponding Chinese Office Action dated Nov. 23, 2007 (Eight (8) pp.).

* cited by examiner

*Primary Examiner*—Dang D Le
(74) *Attorney, Agent, or Firm*—Crowell & Moring LLP

(57) ABSTRACT

An electric rotating machine having permanent magnets having a rotor having a plurality of permanent magnets, a stator iron core disposed in opposite relation with the rotor, and a stator winding wound around the stator core, wherein the stator core is constituted by a yoke and a plurality of teeth portions disposed to the yoke. The teeth portions are projected towards the inner periphery of the rotor. The teeth portions are made of amorphous magnetic material.

7 Claims, 6 Drawing Sheets

MAGNETIZATION CHARACTERISTICS OF
MAGNETIC MATERIALS

COMPARISON OF HIGH FREQUENCY IRON LOSS AMONG MAGNETIC MATERIALS (B=0.1T)

COGGING TORQUE OF 10P – 12S MOTORS

ERROR OF PERFECT CIRCLE OF
INNER DIAMETER OF SINGLE TEETH

ELECTRIC ROTATING MACHINE HAVING PERMANENT MAGNETS AND METHOD OF MANUFACTURING TEETH PORTIONS OF THE STATOR IRON CORE

CLAIM OF PRIORITY

This application claims priority from Japanese application serial No. 2004-287661, filed Sep. 30, 2004, the content of which is hereby incorporated by reference into this application.

DESCRIPTION OF THE INVENTION

1. Field of the Invention

The present invention relates to an electric rotating machine such as motors, generators, etc and a method of manufacturing teeth portions of a stator iron core of the rotating machine, more particularly to an electric rotating machine having permanent magnets in the rotor and a method of manufacturing the teeth portions of the stator iron core.

2. Related Art

Generally, a motor converts electric energy into mechanical energy and a generator converts mechanical energy into electrical energy. Both of them require high conversion efficiency; they are designed to have a highest conversion efficiency at the rated output. The efficiency of the rotating machines is represented by a value of dividing an output by an input, and the difference between the output and the input is a loss such as copper loss or iron loss.

In order to increase efficiency of the electric rotating machine and to downsize the electric rotating machine, magnets containing rare earth elements, which have a high energy product are employed. A stator iron core is a divided structure thereby to increase density of the stator iron core. These structures have been proposed.

However, in a generator of a wind-fan driven generation system, it is desirable that the generator can rotate easily even by breeze; the inertia moment of the rotor and a hysteresis break force should be small. On the other hand, in a motor used as a motive power for assisting operation of a steering wheel of an automobile, design of the rotating machine using magnets with a high energy product was considered difficult, because torque vibration of the motor is transmitted by a driver's operation of the steering wheel or weight of hysteresis breaking force of the motor is not negligible.

The above-mentioned hysteresis breaking force is called a loss torque; it is necessary to use a material with a small hysteresis to reduce the loss torque. As the material there are amorphous metal materials.

Japanese International application laid-open 2002-518975 discloses an electric rotating machine which used amorphous material in a magnetic circuit.

However, in the rotating machine using the amorphous material in the magnetic circuit, mechanical working of the stator is very difficult because of the properties of the amorphous material. Accordingly, the design for obtaining the maximum efficiency of the rotating machine was difficult. Therefore, it was difficult to obtain the downsized rotating machine with reduced loss torque and reduced torque vibration.

SUMMARY OF THE INVENTION

It is an object of the present invention to provide a small sized electric rotating machine with a reduced loss torque and reduced torque vibration.

The electric rotating machine according to the present invention comprises a stator iron core, a yoke and teeth portions that are projected towards the stator, wherein the yoke and the teeth portions are divided and at least the teeth portions are made of amorphous magnetic material.

EXPLANATION OF REFERENCE NUMERALS

Figure 1:
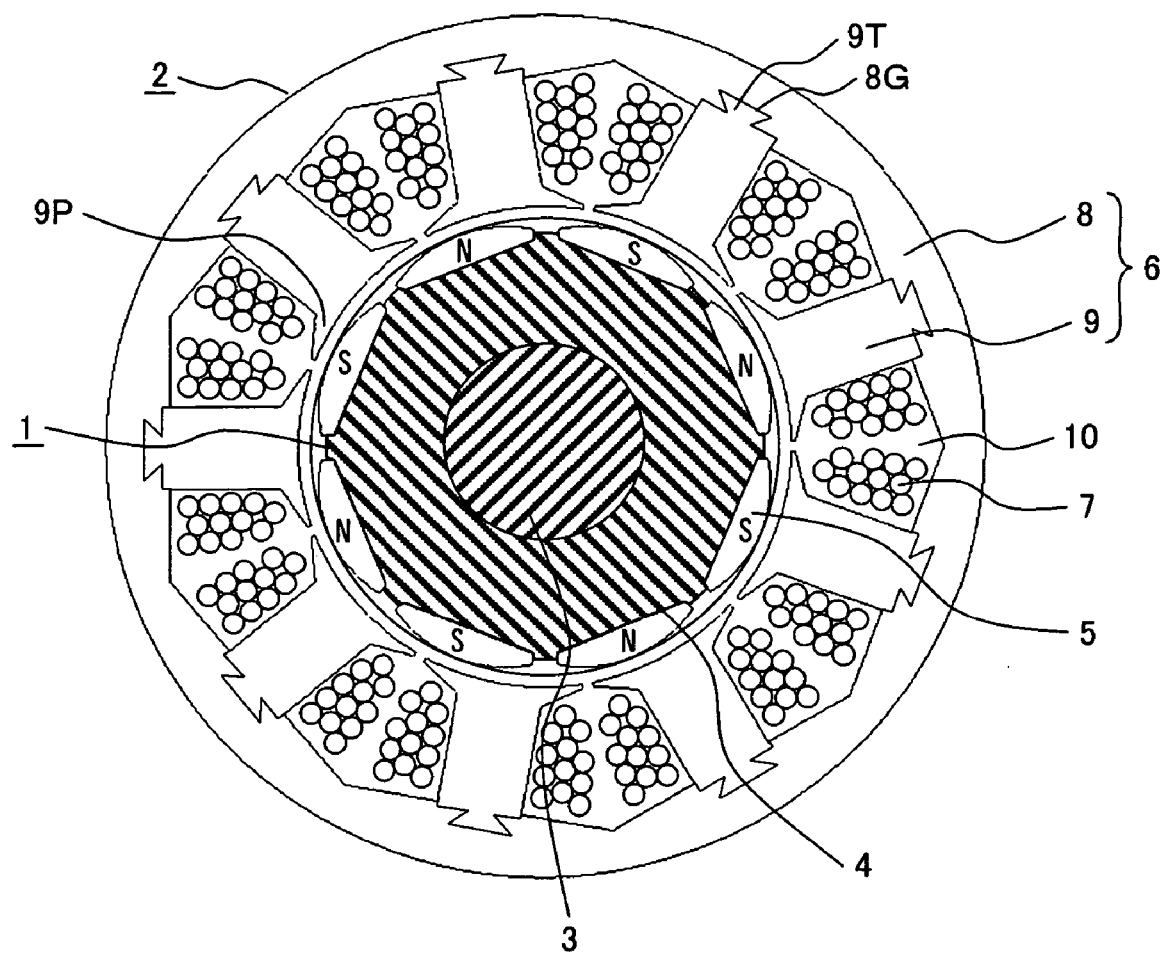
FIG. 1 is a cross sectional view of a motor having permanent magnets according to an embodiment of the present invention.

Rotor 1, stator 2, rotor shaft 3, rotor iron core 4, permanent magnet 5, stator iron core 6, stator winding 7, yoke 8, teeth portion 9, slot 10, amorphous foil strip 12, adhesive coating apparatus 15, die 16, punch 17, heating device 18, cylinder mechanism 19, control device 22, metal mold 23, pressure member 24, motor 28, generator 30.

DETAILED DESCRIPTION OF THE PREFERRED EMBODIMENTS

According to the embodiments of the present invention, the size of working units of the amorphous magnetic material can be reduced by dividing the teeth portions and the yoke portion. As a result, the mechanical working of the amorphous material, which has been considered difficult, can be conducted relatively easily. It is possible to realize a downsized electric rotating machine with a small loss torque and torque vibration by synergetic effects of the rotor having permanent magnets and the stator iron core made of amorphous magnetic material.

In the following, embodiment 1 concerning the electric rotating machine having permanent magnets will be explained by reference to FIG. 1.

The motor shown in FIG. 1 is constituted by a rotor 1 rotatably supported by a bearing (not shown) and a stator 2 disposed around the rotor.

The rotor 1 is provided with the rotor shaft 3 supported by the bearing, a rotor iron core 4 fixed to the rotor shaft 3 and a plurality of permanent magnets 5 disposed around the rotor iron core 4, the magnets being arranged coaxially with the rotor shaft 3. In the embodiment there are 8 permanent magnets to constitute 8 poles rotor 1.

The stator 2 comprises a stator iron core 6 opposite to the rotor 1 with a gap in the circumferential direction, and stator windings 7 wound around the stator iron core 6. The stator iron core 6 is constituted by a circular yoke 8 and a plurality of teeth portions 9, which may be made of a different material from that of the yoke 8 and divided from the yoke 8. In this embodiment, there are 9 teeth portions.

The yoke 8 has dovetail grooves 8G in the inner periphery at a constant interval, and the teeth portions 9 form curved magnetic poles 9P at one end thereof along the inner side of the rotor 1 and dovetails 9T at the other end thereof. The dovetails 9T of the teeth portions 9 are inserted into the dovetail grooves 8G of the yoke 8 to fix the teeth portions 9 to the yoke 8, the teeth portions projecting towards the center axis of the rotor shaft 3.

The stator winding 7 are wound around the teeth portions 9 to be confined in 9 slots 10 formed between the teeth portions 9.

According to the above structure, an electric rotating machine with 9 slots-8 poles permanent magnets is obtained; the yoke 8 of the stator iron core 6 is made of laminated silicon steel plates and the teeth portions 9 are made of an amorphous magnetic material.

In the specification, the amorphous magnetic material includes pure amorphous magnetic metals and mixtures of amorphous magnetic metals and other magnetic materials.

Figure 2:
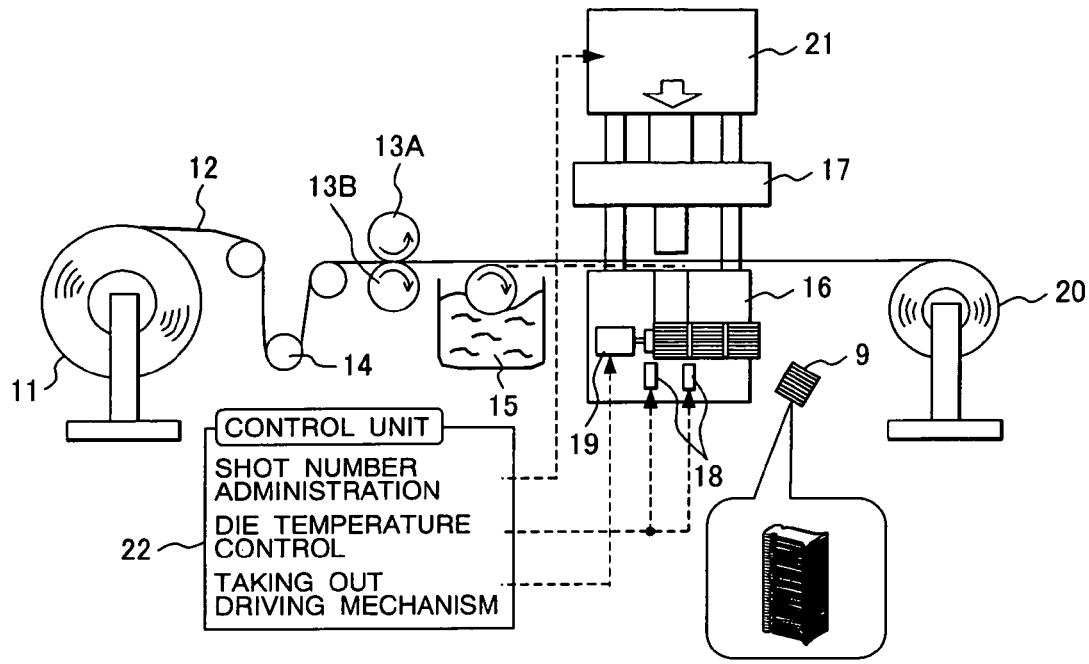
FIG. 2 is a block diagram showing a plant for manufacturing the teeth portions of the stator iron core from amorphous foil strips.

The amorphous magnetic materials in this embodiment may be foil strips of the amorphous magnetic material. The teeth portions are formed by punching the foil strips and laminated the punched foils. A method of manufacturing the teeth portions of the amorphous magnetic metal foil strips is explained by reference to FIG. 2 in the following.

An amorphous foil strip 12 having a thickness of 0.025 mm is fed from the coil 11 at a constant speed by a feeder mechanism comprising a pair of driving rolls 13A, 13B and tension rollers 14, etc. The amorphous metal foil strips are coated with an adhesive such as a thermosetting resin by an adhesive coating apparatus 15. The amorphous metal foil strips 12 with the adhesive coating are punched by a die 16 and a punch 17 into a shape of the teeth portion 9. The punched foils segments are stacked in the bottom of the die 16. The punched foils are pressed down by the punch 17 every stacking and the stacked foils are heated by the heater 18 disposed at the bottom of the die 16 to cure the adhesive thereby to bond the stacked amorphous metal foils. When the bonded foils becomes a predetermined thickness to form a teeth portion, the stacked and bonded foils are transferred out from the die 16 by a cylinder mechanism 19 disposed at the bottom of the die 16. The amorphous metal foil strip 12, which is punched, is wound by a winding device 20 and is disposed of.

The number of punchings by the press machine 21 that drives the punch 17, the heater 18 and cylinder mechanism 19 are controlled in accordance with data inputted in the control apparatus 22.

Figure 3:
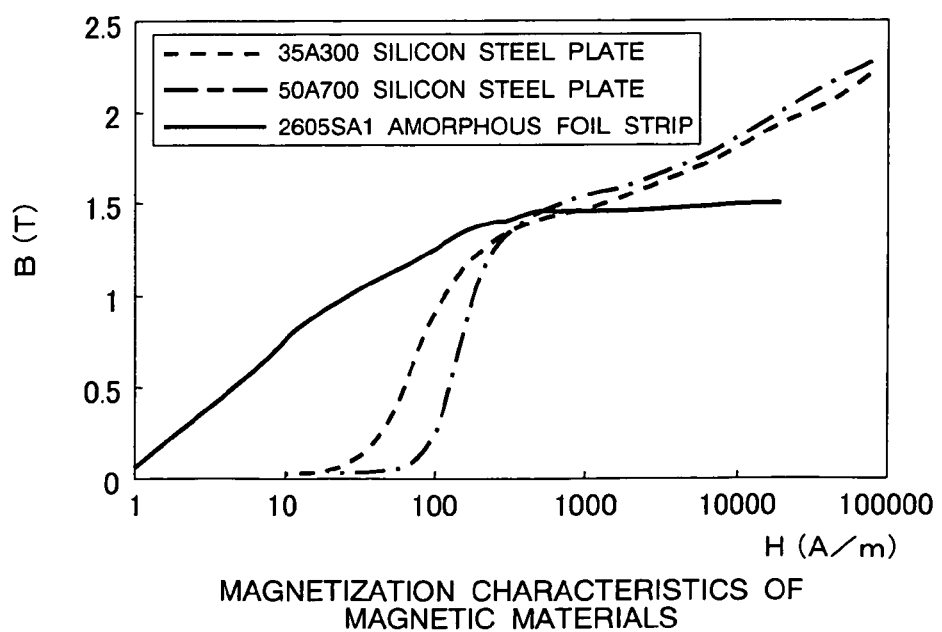
FIG. 3 is a graph showing comparison of direct current magnetization characteristics with respect to magnetic materials.
Figure 4:
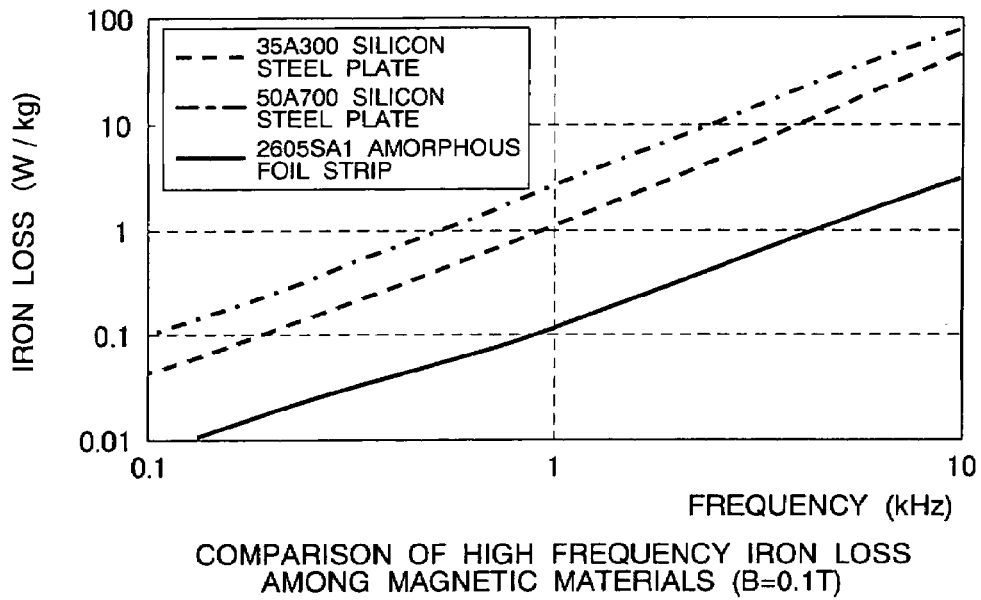
FIG. 4 is a graph showing comparison of high frequency iron loss characteristics with respect to magnetic materials.

According to this embodiment, magnetic characteristics shown in FIGS. 3 and 4 are obtained by employing the rotor 1 having permanent magnets and the stator iron core 6 having the teeth portions 9 made of laminated amorphous magnetic material.

That is, compared with a stator iron core having teeth portions made of silicon steel (35A300, 50A700 See Japanese Industrial Standard JIS C 2552 (2000)) plates with a relatively low iron loss, the stator iron core 6 having the teeth portions 9 made of laminated amorphous magnetic material, which has a high magnetic permeability (a rise time of magnetization characteristics), but has a low maximum saturation magnetic flux density. Further, an iron loss generated in the stator iron core of this embodiment is smaller than that of the silicon steel plates (35A300, 50A700). In particular, as far as the iron loss is concerned, hysteresis loss and eddy current loss are small so that the loss torque, which is a hysteresis breaking force, can be reduced.

In the stator iron core made of silicon steel plates and the stator iron core of the embodiment, if a magnetic flux generated from the permanent magnets of the rotor is the same and if the same output is obtained by the same size, the quantity of flux that passes through the teeth portions of the embodiment is smaller than that of the teeth portions of the silicon steel plates because of saturation of the teeth portions. However, since the teeth portions 9 are fixed to the yoke 8 in the embodiment, it is possible to make the width of the teeth portions 9 wider thereby to increase the quantity of flux that passes through the teeth portions. Since the winding of the stator windings around the teeth portions 9 can be done before the teeth portions 9 are assembled to the yoke 8, the winding job of the stator windings around the widened teeth portions 9 is easy.

On the other hand, the yoke 8 may be made of silicon steel plates or amorphous magnetic material foils, as long as the necessary sectional area of the teeth portions is secured.

Amorphous metals are a hard material and have 3 to 5 times tensile strength of silicon steel. If a stator iron core, which is united with the yoke, is punched from amorphous metal foil, an expensive die is required and caulking lamination of the punched foils is difficult, which means that the industrial production is difficult.

However, when the teeth portions whose periphery length is short are punched, the metal mold can be less expensive. Further, punching, lamination and bonding the staked foils with an adhesive make it possible to omit a caulking step, which is troublesome work.

Figure 5:
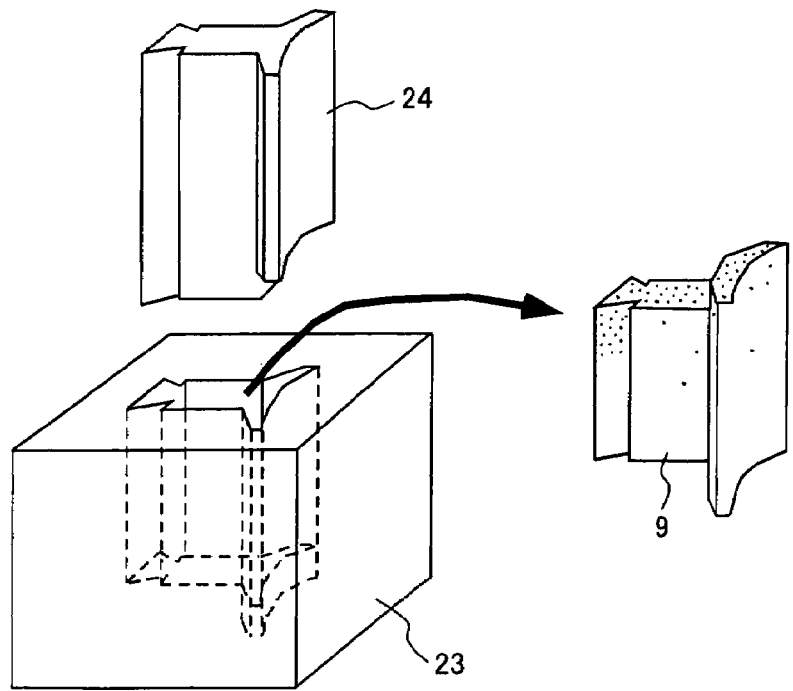
FIG. 5 shows a part of the process for manufacturing the teeth portions of the stator iron core from amorphous metal particles.

Although in the above mentioned embodiment the amorphous metal foils are laminated, the teeth portions may be manufactured by the method shown in FIG. 5 in which the amorphous metal is used in the form of fine particles.

An amorphous metal foil has a maximum thickness of 0.025 mm. On the other hand, amorphous metal can be particles having a particle size of 0.5 mm. The amorphous particles can be used to manufacture teeth portions. A mixture of amorphous particles and magnetic powder such as pure iron powder is charged in a mold 23 having a shape of the teeth portion 9, then the mixture is pressed with a pressing member 24 to form the teeth portion 9.

As discussed above, by compacting the mixture of the amorphous metal particles and other magnetic material, the saturated magnetic flux density is increased. Since the amorphous metal particles are of high hardness and are hard to be deformed during the compacting, it is hard to obtain high density. The compacted mixture can make a teeth portion 9 of high density because the other magnetic material is easily deformed and fills the gaps of the amorphous particles. The density of the teeth portion increases to obtain the teeth portion with a low iron loss and a low loss torque.

Because the teeth portion 9 is produced by compacting of the amorphous metal particles, the teeth portions such as magnetic poles 9P, which have a length in the axial direction different from a width of the leg portions (where coils are wound) may be freely designed.

Figure 6:
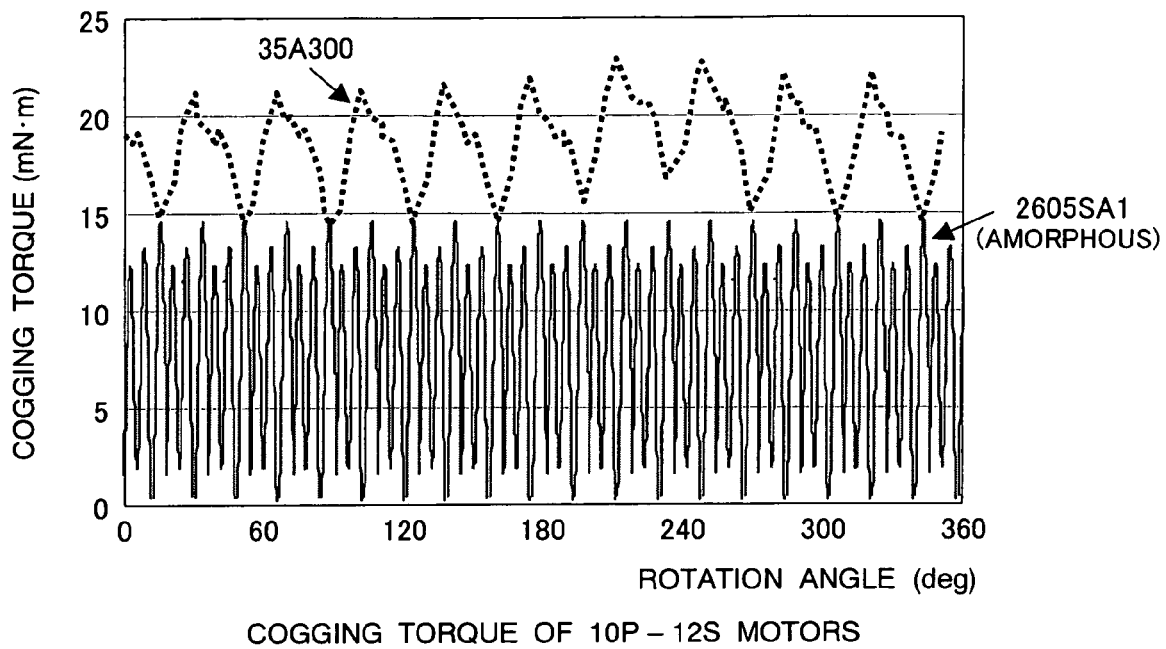
FIG. 6 is a graph showing measurement results of cogging torque of the motor according to the present invention.

FIG. 6 shows measurement results of cogging torques of a motor of the present invention, which has the stator iron core whose teeth portions are made of press-molded or compacted amorphous magnetic material and the yoke is made of silicon steel plates and the conventional motor, which has the stator iron core made of silicon steel plates (35A300). The motors are 10 poles-12 slots motors having the same dimension.

Figure 7:
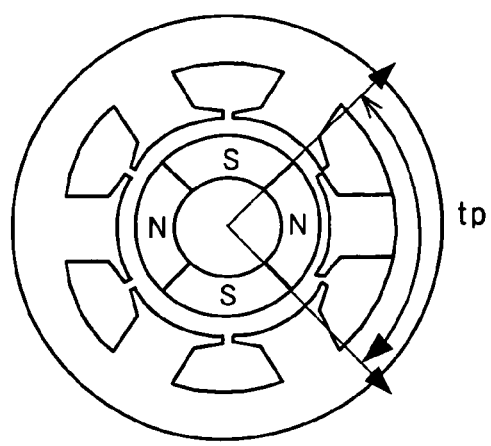
FIG. 7 is a plan view of a rotor for explaining the relationship between the degree of the perfect circle and cogging torque.

Normally, a vibration cycle of cogging torque per one rotation is the lowest common multiple of the number of poles and the number of slots. In case where a motor has a stator core whose yoke portions and teeth portions are divided, there is a limit of increasing a dimensional precision such as the degree of the perfect circle of the teeth portions. According to the simple model shown in FIG. 7, one of the teeth portions is projected toward the center of the rotor so that the projected teeth portion is closer to the magnets than the other teeth portions. Accordingly, it is apparent that the wave form is accompanied by a vibration equivalent to the number of poles according to the circularity of the stator iron core.

The circularity of the stators of the compared motors was about 0.03 mm, which is not perfect. In the motor where the stator was made only of silicon steel plates, low frequency vibration of 10 cycles per one rotation, which is equivalent to the number of poles of the rotor, was observed.

From the above result, it was revealed that the stator iron core having the teeth portions made of amorphous magnetic material made influences of manufacturing precision small on cogging torque. That is, when the amorphous magnetic material is used for the teeth portions, vibration of the lowest common multiple of the numbers of the poles and the slots is created every turn. In view of reduction of vibration and noise of the motors, it is possible to remove unpleasant noise with a low frequency (1 kHz or lower) by setting the frequency of vibration, which is in a range of audibility at a rated rotation speed.

For example, the cogging torque frequency of a 12 slots-10 poles motor that rotates at 3,000 rpm is 3 kHz. The relationship between the numbers of the slots and the poles in the motor that use amorphous magnetic material is preferably set to be the lowest common multiple as large as possible. Therefore, it should be avoided that the lowest common multiple is as low as 20 or less in a three slots-2poles motor, for example.

Figure 8:
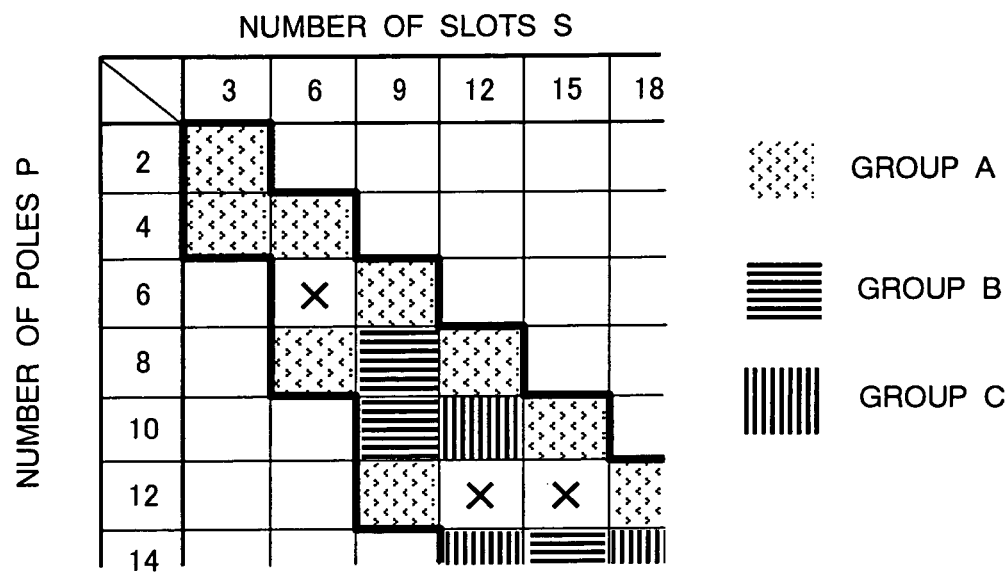
FIG. 8 is a diagram for explaining the relationship between the number of stator slots and the number of rotor poles.

FIG. 8 shows relationship between the number of slots and the number of poles of a motor. In group A, a ratio of the number P of poles to the number S of slots is 2:3 or 4:3, In group B, the number P of poles and the number S of slots are represented: P=S+−1 series. In group C, the number pf poles and the number of slots are represented by the following formulae.

(2/3) S<P<(4/3), S=6n, or P≦6n−2 or P≧6n+2, where P is a multiple of 2, and n is an integer of 2 or more.

In the figure, x represents the case where three phase motor does not exist. Groups A to C are combinations of relationship between the number of the slots and the number of the poles that can form three phase motors. In the combinations of A to C, the combination of A has been employed in the conventional motors. In the motor using the amorphous magnetic material for the teeth portions, the employment of the lowest common multiple (in other words, pulsation of cogging torque) of 20 or more is preferable from the above mentioned reasons.

The groups B and C have the lowest common multiple of several tens or more. In the motors that employ the amorphous magnetic material for the teeth portions, the groups B and C are employed.

It is apparent from FIG. 6 that the average cogging torque, i.e. loss torque of the conventional motor that uses silicon steel plates (35A300) for the teeth portions is 18.0 mN.m, but the average cogging torque of the motor that uses amorphous magnetic material for the teeth portions is only 7.5 mN.m, which is less than half that of the conventional motor. This result harmonizes with the data shown in FIG. 4, wherein the smaller the hysteresis loss, the smaller the loss torque becomes smaller.

Figure 9:
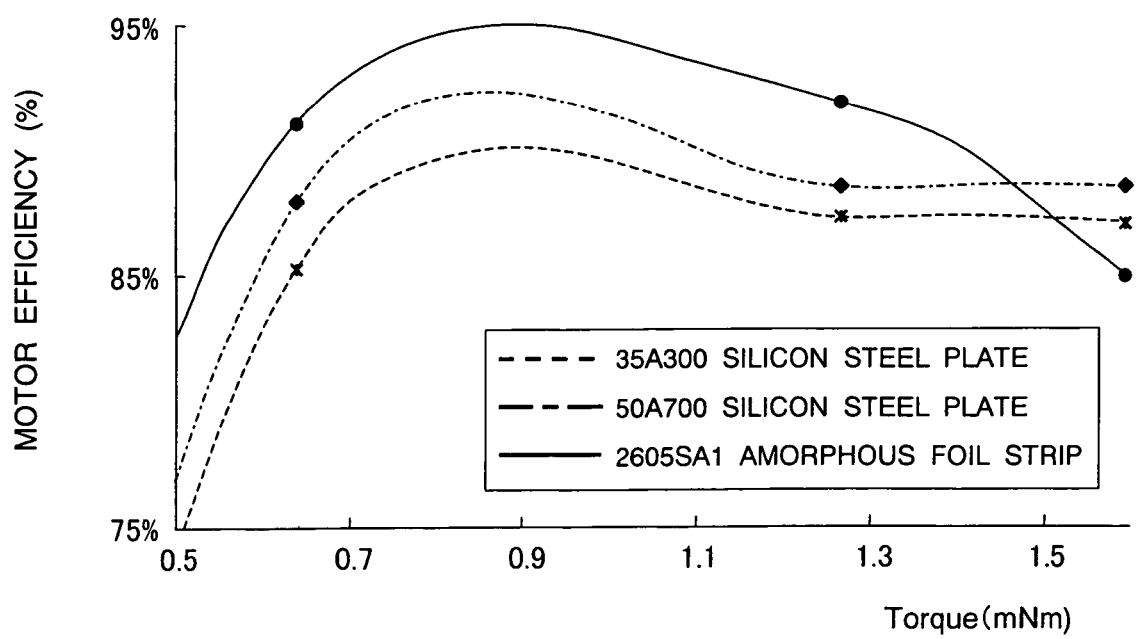
FIG. 9 is a graph showing relationship between the motor efficiency and the load torque.

FIG. 9 shows relationship between efficiencies (%) of trial motors and the load torque, which shows that the motor using the amorphous magnetic material for teeth portions exhibits higher efficiency than the motors having the stator iron core using silicon steel plates (35A300, 50A470) over almost the entire range.

Figure 10:
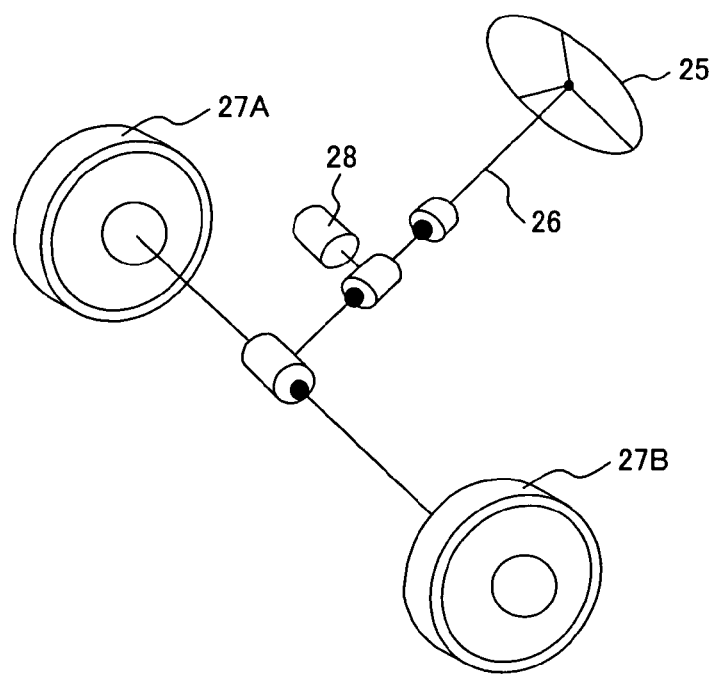
FIG. 10 is a perspective view of a main part of a steering device to which the motor of the present invention is applied.

FIG. 10 shows a diagrammatic perspective view of a steering apparatus of an automobile, which uses a motor having teeth portion made of amorphous magnetic material. The motor is used as an assisting driving force for the steering rotation. The steering apparatus transmits a rotating force of the steering wheel 25 to a steering shaft 26; a rotating movement of the steering shaft 26 is transmitted to wheels 27A, 27B to change a direction of the automobile. When a driver operates the steering wheel, the rotation operation is assisted by means of the steering shaft 26 via the motor 28.

The motor 28 has a rotor with permanent magnets to form magnetic poles, wherein the teeth portions of the stator are made of amorphous magnetic material. The motor has a small hysteresis loss and a small loss torque whereby the feeling of weight by the operation of the motor 28 is removed and pulsation of the motor transmitted from the steering wheel is reduced. As a result, operation of the steering wheel by the driver can be done easily.

Further, since the motor 28 has a high efficiency over almost the entire range of the operation, it is particularly suitable for applications such as automobiles, which have to use batteries as an electric power source for the motor and should reduces fuel consumption. Since the motor 28 has a stator iron core constituted by a yoke and teeth portions divided from the yoke, the teeth portions being inserted into the yoke after stator windings are wound, an occupying rate of the stator windings is increased thereby to downsize the motor 28 so that installation of the motor in the limited space of the automobile is easy.

Figure 11:
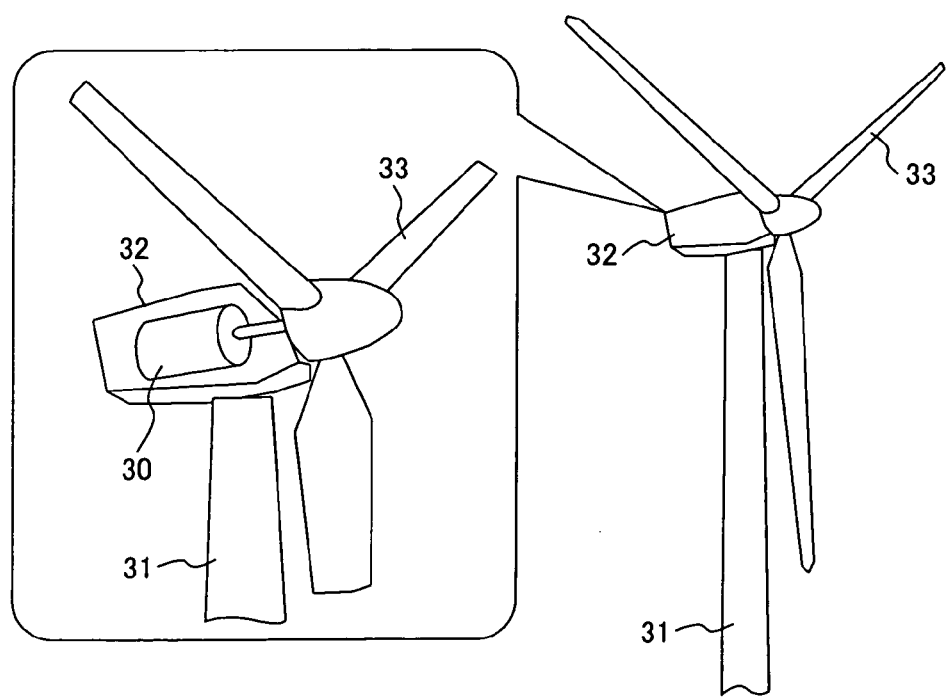
FIG. 11 is a perspective view of a wind-fan driven electric generation system to which the generator of the present invention is applied.

FIG. 11 shows a perspective view of a wind-fan driven electric power generator system to which the present invention is applied, wherein a motor has a rotor with permanent magnets and a stator whose teeth portions are made of amorphous magnetic material. The wind-fan driven electric power generation system comprises a support column 31 fixed on a base and an electric power generation apparatus 32, wherein the electric power generation apparatus 32 is installed atop the support column 31. The generation apparatus 32 is supported rotatably as the center of the column 31 to rotate 360 degrees. The generation apparatus 32 has a shaft to which a wind fan 33 is directly connected or connected via gears.

In the wind-fan driven electric power generation apparatus, rotation of the wind-fan would have been hindered by loss torque due to hysteresis loss of the generator 30. However, in this embodiment, since the loss torque due to hysteresis loss is reduced, rotation of the wind fan 30 is not hindered by the generator 33 and efficiency of electric generation is increased.

The efficiency of the electric generation of the generator 30 is increased in a desired output range, and the rotation of the wind-fan is not hindered at breezing. That is, quantity of electricity in a low output range at breezing is added to obtain wind fan driven generation with a high efficiency.

In the above embodiment, the yoke of the stator iron core is made of silicon steel plates, and the teeth portion are made of amorphous magnetic material; the yoke may be made of the amorphous magnetic material, too. Since the amorphous magnetic material is poor in workability, the yoke and the teeth portions should be divided to assemble them after working. The divided structure of the yoke and the teeth portions makes a peripheral length of punched segments short in manufacturing the amorphous metal foil strips, so that a large punching force is not necessary, compared with punching of a united yoke and teeth portion.

Only the yoke may be a wound core made of the amorphous metal foil strips. The amorphous magnetic material may be amorphous metal particles. The yoke and teeth portion are press-molded separately. As a result, the press-molding of the amorphous particles is conducted by a small press force, compared with the press-molding of the united shape of the yoke and the teeth portion.

Yokes and teeth portions are made of compacted amorphous metal particles or amorphous metal foil strips. The amorphous yoke and the amorphous teeth portion may be combined appropriately, which expands freedom of design of the electric rotating machine.

What is claimed is:

1. An electric rotating machine having permanent magnets comprising a rotor having a plurality of permanent magnets, a stator core disposed in opposite relation with respect to rotating the rotor, and a stator winding wound around the stator core, wherein the stator core is constituted by a yoke and a plurality of teeth portions disposed to the yoke, the teeth portions being projected towards the inner periphery of the rotor, and wherein the teeth portions are made of compacted magnetic particles of amorphous magnetic material and another magnetic material for filling gaps of the amorphous magnetic material, and wherein a relationship between the number S of slots formed in the stator core and the number P of poles of the rotor is represented by $P=S\pm1$, or when $(2/3)S<P<(4/3)S$, $S=6n$ or $P\leq6n-2$ or $P\geq6n+2$, where P is a multiple of 2, and n is an integer of 2 or more.

2. The electrical rotating machine according to claim 1, wherein the yoke is constituted by laminating silicon steel plates.

3. The electric rotating machine according to claim 1, wherein the teeth portions are made of laminated foil strips.

4. An electric rotating machine having permanent magnets comprising a rotor having a plurality of permanent magnets, a stator core disposed in opposite relation with the respect to rotation of the rotor, and a stator winding wound around the stator core, wherein the stator core is constituted by a yoke and a plurality of teeth portions disposed to the yoke, the teeth portions being projected towards the rotor, and wherein the teeth portions are made of laminated strips made of compacted magnetic particles of amorphous magnetic material and another magnetic material for filling gaps of the amorphous magnetic material that have a stacking direction in an axial direction of the yoke, and wherein a relationship between the number S of slots formed in the stator core and the number P of poles of the rotor is represented by $P=S\pm1$, or when $(2/3)S<P<(4/3)S$, $S=6n$ or $P\leq6n-2$ or $P\geq6n+2$, where P is a multiple of 2, and n is an integer of 2 or more.

5. The electric rotating machine according to claim 4, wherein the yoke is constituted by laminating silicon steel plates.

6. A steering device having a motor defined in claim 4, the motor being a motive power for assisting an operation of a steering wheel for an automobile.

7. A wind-fan driven electric generation system having a generator defined in claim 4, the generator being driven by turning force of a wind fan.

\* \* \* \* \*